April 20, 1926.
O. H. HENDERSON
CABLE CONNECTER
Filed June 15, 1925
1,581,575
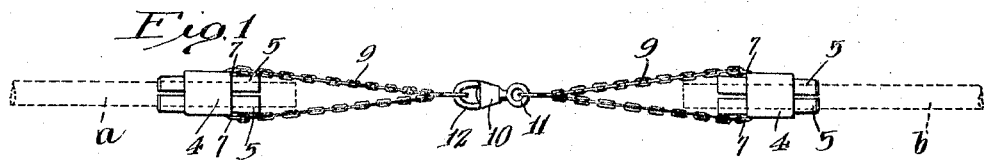
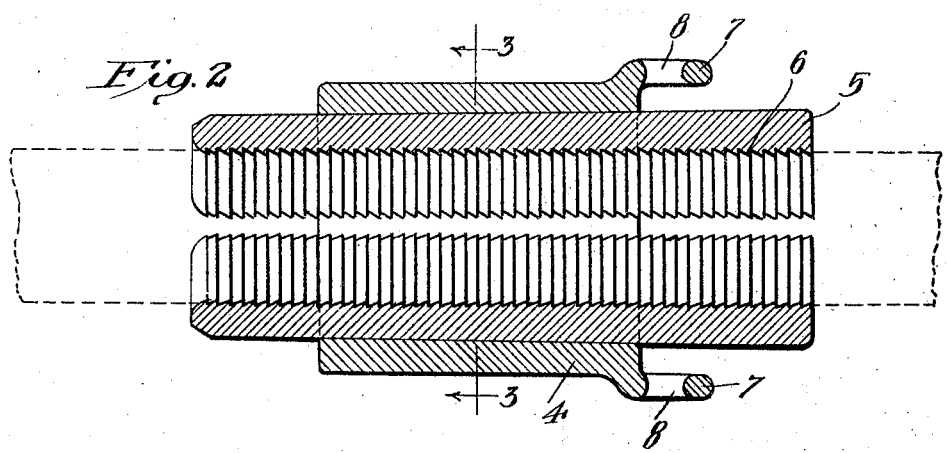
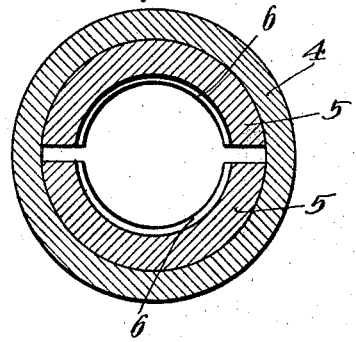
Inventor
Orton H. Henderson
By Lyon & Lyon
Attorneys Patented Apr. 20, 1926.

1,581,575

UNITED STATES PATENT OFFICE.

ORTON H. HENDERSON, OF LONG BEACH, CALIFORNIA.

CABLE CONNECTER.

Application filed June 15, 1925. Serial No. 37,231.

*To all whom it may concern:*

Be it known that I, ORTON H. HENDERSON, a citizen of the United States, residing at Long Beach, in the county of Los Angeles and State of California, have invented a new and useful Cable Connecter, of which the following is a specification.

This invention relates to cable connecters of the type useful in connecting the end of a new cable to the end of an old one for the purpose of drawing the new cable through a pulley block.

A common practice in preparing to substitute a new cable for an old one in a traveling block or the crown block of an oil well derrick is to overlap the ends of the cables, drive a flattened nail through them and then wrap with a rope the joint thus made. After this is done the new cable is drawn into the pulley block or around the sheave of the crown block by pulling the old cable through.

An object of the invention is to provide a device that can be clamped onto the ends of cables and that will permit of relative swiveling or rotation between the cables.

A further object is to provide a comparatively simple construction for this purpose and one that will not permit the cables to slip from the clamp.

The accompanying drawings illustrate the invention:

Fig. 1 is a longitudinal view of a cable connecter constructed in accordance with the provisions of this invention, cables being indicated in the connecter in broken lines.

Fig. 2 is an enlarged longitudinal section of one of the clamps, a cable being indicated in broken lines in the clamp.

Fig. 3 is a transverse section on the line indicated by 3—3, Fig. 2.

A pair of clamps is provided and, since the clamps are identical in construction, only one of them need be described. Each clamp comprises a tubular member or sleeve 4 and slips 5 inside of said sleeve. There is a wedging action between the sleeve 4 and slips 5 and said sleeve and slips cooperate to wedge the slips inwardly when the sleeve is moved longitudinally with respect to the slips, and to effect this, in this instance, the bore of the sleeve is tapered and also the slips are externally tapered so that, when a cable is threaded through the sleeve and the slips are placed on opposite sides of said cable and the slips are inserted in the sleeve, the slips will be wedged toward one another to firmly clamp the cable between them. To increase the gripping effect of the slips it is preferable to provide projections or teeth on the inner faces of the slips as indicated at 6.

The sleeve 4 is provided on opposite sides near one end with lugs 7 having eyes 8 therein, said lugs being spaced somewhat from the periphery of the slips 5. The lugs 7 are at that end of the sleeve having the larger bore diameter.

Each of the clamps, as above described, is provided with a bail 9 which, in this instance, is flexible, being composed of chains. The opposite ends of each bail are engaged with the eyes 8 of the respective clamp. The bails 9 are connected to each other by any suitable means and, preferably, such means admits of relative rotation between the bails and, therefore, is in the form of a swivel 10, one eye 11 of the swivel being connected to one of the bails, and the other eye 12 being connected to the other bail.

To use the invention, when it is desired to replace an old cable with a new one in a pulley block, one end of the old cable, indicated in Fig. 1 at *a*, will be secured between the slips of one of the clamps in the manner described above, and one end of the new cable, indicated at *b*, will be caught between the slips of the other clamp. Then the old cable will be drawn through the pulley block together with the clamps, the bail and swivel, so as to draw the new cable around the pulley.

It will be noted that the smaller bore portions of the sleeve 4 are turned away from each other so that pulling of the cables *a*, *b* away from one another will tend to slide the slips further into the smaller bore portions to wedge them more firmly upon the cables. Because of the provision of the swivel 10, the new cable attached thereto will unwind from the spool, upon which it has been coiled by the manufacturer, without kinking. This is very important and the operation is materially facilitated because of the fact that the new cable can swivel or rotate relative to the old one while the new cable is being unwound from the spool. When the cables are connected without the use of a swivel joint, as the new cable comes off of the spool it twists, coils and gets kinks in it because of it not rotating about its axis Thus the invention may be used for conveniently replacing the old sand lines, casing lines and tubing lines with new cables.

I claim:

1. A connecter for cables comprising a pair of clamps, bails for the respective clamps, and a swivel connecting the bails.

2. A connecter for cables comprising a pair of clamps, flexible bails for the respective clamps and a swivel connecting the bails.

Signed at Long Beach, California, this 6th day of June 1925.

ORTON H. HENDERSON.